United States Patent [19]

Mahmoud

[11] Patent Number: 4,882,743

[45] Date of Patent: Nov. 21, 1989

[54] MULTI-LOCATION VIDEO CONFERENCE SYSTEM

[75] Inventor: M. Fatein Mahmoud, Middletown, N.J.

[73] Assignees: American Telephone and Telegraph, New York, N.Y.; AT&T Bell Laboratories, Murray Hill, N.J.

[21] Appl. No.: 226,491

[22] Filed: Aug. 1, 1988

[51] Int. Cl.[4] .................. H04M 11/00; H04N 7/14
[52] U.S. Cl. ............................. 379/53; 358/85
[58] Field of Search .................. 379/53, 54; 358/85

[56] References Cited

U.S. PATENT DOCUMENTS

| | | | |
|---|---|---|---|
| 4,360,827 | 11/1982 | Braun | 379/54 X |
| 4,516,156 | 5/1985 | Fabris et al. | 358/85 |
| 4,529,839 | 7/1985 | Colton et al. | 379/53 X |

OTHER PUBLICATIONS

L. Spilman, "Customized Digital Network for the Department of Defense", *AT&T Technology*, vol. 1, No. 1, pp. 58–65 (undated).
Letti et al., "Centralized Management and Control Architecture for the Defense Telecommunications Network," IEEE International Conference on Communications, '86, 22–25 Jun. 1986, Toronto, Canada, Conf. Rec., vol. 3, pp. 1584–1586.
Richard Adleman, "Defense Commercial Telecommunications Network (DCTN)–A Digital Integrated Services Network," IEEE International Conference on Communications 1985, Chicago, Il., 23–26 Jun. 1985, Conf. Rec. vol. 1, pp. 244–246.
Deacon et al, "DCTN: An Integrated Services Digital Network for the Department of Defense" IEEE Military Communications Conference, 5–9, Oct. 1986, Monterey, Calif., Conf. Rec. vol. 3, pp. 50.4.1–50.4.2.
Larry Spillman, "Custom Video Network for DOD," *Teleconference*, vol. 7, No. 2, Jul. 1988, pp. 16–19.

*Primary Examiner*—Keith E. George
*Attorney, Agent, or Firm*—Eli Weiss

[57] ABSTRACT

The invention, which can be used with AT&T SKYNET ® digital satellite communications service allows a conference director to control a teleconference between several conference rooms. In this invention there are two transmitting channels, one being identified as a broadcast channel and the other is identified as an auxiliary channel. The conference director can assign the broadcast channel to any room and the auxiliary channel to any other room. The video signal on the broadcast channel is sent to a first satellite dish for frequency division multiple access transmission via a satellite to all of the other conference rooms. The video signal on the auxiliary channel is sent to a second satellite dish for frequency division multiple access transmission via the satellite to the conference room from which the broadcast channel originates.

8 Claims, 13 Drawing Sheets

FIG. 9

```
CONFIR

CONFERENCE STATUS

ROOM      STATUS       ROOM REPORT

3        ACTIVE
     4        ACTIVE
     5        ACTIVE       Poor Picture, Room Problem

SYSTEM STATUS

Last command, SETUP, was received by VTSC.
Link to VTSC is OK                              Wed, Feb 18 13:34

COMMANDS:

┌─────────────────┐
    │ Setup Conference│    Freeze Conference
    └─────────────────┘    Unfreeze Conference
     Add Room              Room Termination Warning
     Delete Room           Transfer Coordinator Warning
     Transfer Coordinator  Conference Termination Warning
     Takedown Conference Use TAB or ARROW key to SELECT-RETURN key to ACTIVATE-e key to EXIT
```

MULTI-LOCATION VIDEO CONFERENCE SYSTEM

TECHNICAL FIELD

This invention relates to systems for teleconferencing among remote locations and, more particularly, to apparatus and methods for providing real-time, multiple location, face-to-face video and audio conference capabilities among locations which are physically remote.

BACKGROUND OF THE INVENTION

In all areas, whether it be technical, business or educational; and at all levels from the initial presentation of a proposal to the setting of corporate policy, there is a growing need to meet with others to exchange ideas, information, data, drawings and the like.

Typically, in the business arena, executive meetings, customer demonstrations, product development, administration matters, education/training offerings and the like usually require a conference meeting.

Normally, a conference is the only practical means of communicating with people having a common interest in a specific subject. If the conference is with people who are located in the same building or in a common geographical area, the conference can be an extremely efficient method of transmitting ideas and resolving issues. When, however, the participants of the conference are at remote locations, i.e. different cities, some of the participants will experience inconveniences in traveling to and from the conference.

A new and more efficient method or procedure for meeting with people to exchange ideas and information is needed. For example, is it necessary for a group of people to travel long distances and spend many hours away from their offices to attend a meeting or a conference in some distant city? Clearly, the actual time spent at the meeting is important. But, the time and money spent in going to and from the meeting, and the cost of being away from the office just to travel to a conference can place an unreasonable burden upon an individual and a corporation. The pressures of business demand that individuals use their business time in the most optimum way.

The present invention is directed toward of solving this type of problem.

SUMMARY OF THE INVENTION

In accordance with the illustrative embodiment of the present invention, attendees of meetings and conferences can now obtain all the benefits of being present at and being an active participant without being required to actually travel to a distant city. Briefly, there is disclosed a method and apparatus for holding conferences and meetings on a face-to-face basis via multi-location video teleconferencing.

Multilocation video teleconferencing provides real-time, multiple location, face-to-face video and audio conference capabilities. The system architecture can have a satellite channel to broadcast information among the various conference rooms. The simple architecture of a multilocation video teleconference is that one or more video conference room is connected to an earth station via baseband lines. All earth stations communicate with each other via a C-Band or KU-Band satellite. Each earth station provides the transmit (up-link) and the receive (down-link) channels to and from the satellite at the appropriate power, frequency, and polarization. In the simplest form, one full duplex satellite channel with data rate from 56 Kbps to 1,544 Mbps is required per conference. The receive channel for all the earth stations is turned on all the time. Since there can be only one conference room using the transmit channel at any time, the director of the conference controls this up-link. Through the control mechanism, the director can turn on the transmitter of any conference room to broadcast to the other conference rooms, and at the same time, the director turns the transmitters of all the other conference rooms off. The director can transfer this broadcast channel from one conference room to another. In the full form of the multilocation video teleconferencing, a second full duplex satellite channel, called the auxiliary channel, is required to enhance the conferencing capability of having a full interactive video and audio conference between two rooms. Through the control mechanism, the director can also designate the conference room that can transmit on this channel. The only room that receives this channel is the broadcasting room at that particular time.

Briefly, the invention, which can be used with AT&T SKYNET ® Digital satellite communications service, allows a conference director to control a teleconference, which includes several conference rooms on a dynamic basis. The conference director determines which one of the rooms can use the broadcast channel to be seen by all of the remaining rooms. A control network performs dynamic switching to bring the new video signals to all of the rooms very quickly. At the same time, the director can assign an auxiliary channel to any other room to be seen only by the broadcaster.

Initially, before the conference starts, a Video Teleconferencing Switching Controller (VTSC) is set. During the dynamic switching that occurs in the course of the conference, the video teleconferencing switching controller receives commands from the director's room and requests to broadcast from the common conference rooms through Video Conference Controllers (VCC) located in the various conference rooms. The conferees send their commands to the Video Conference Controllers through a Session Control Panel (SCP), a touch sensitive screen. The video teleconferencing switching controller sends commands to local controllers, called Monitor And Remote Controllers (MONARCS) at the earth stations to execute the director's commands. Each Monitor And Remote Controller translates the commands received from the video teleconferencing switching controller to control the associated satellite modem at the earth station according to the director's commands. This control involves three basic functions as follows:

(1) tune the modulator to the desired frequency; (2) turn the modulator on and off. The control signals can be transmitted via the Public Switched Network lines; and (3) tune the demodulator to the desired frequency.

BRIEF DESCRIPTION OF THE DRAWING

FIG. 9 illustrates control and warning message which can be generated by the Quick and Direct Management System;

DETAILED DESCRIPTION

Figure 1:
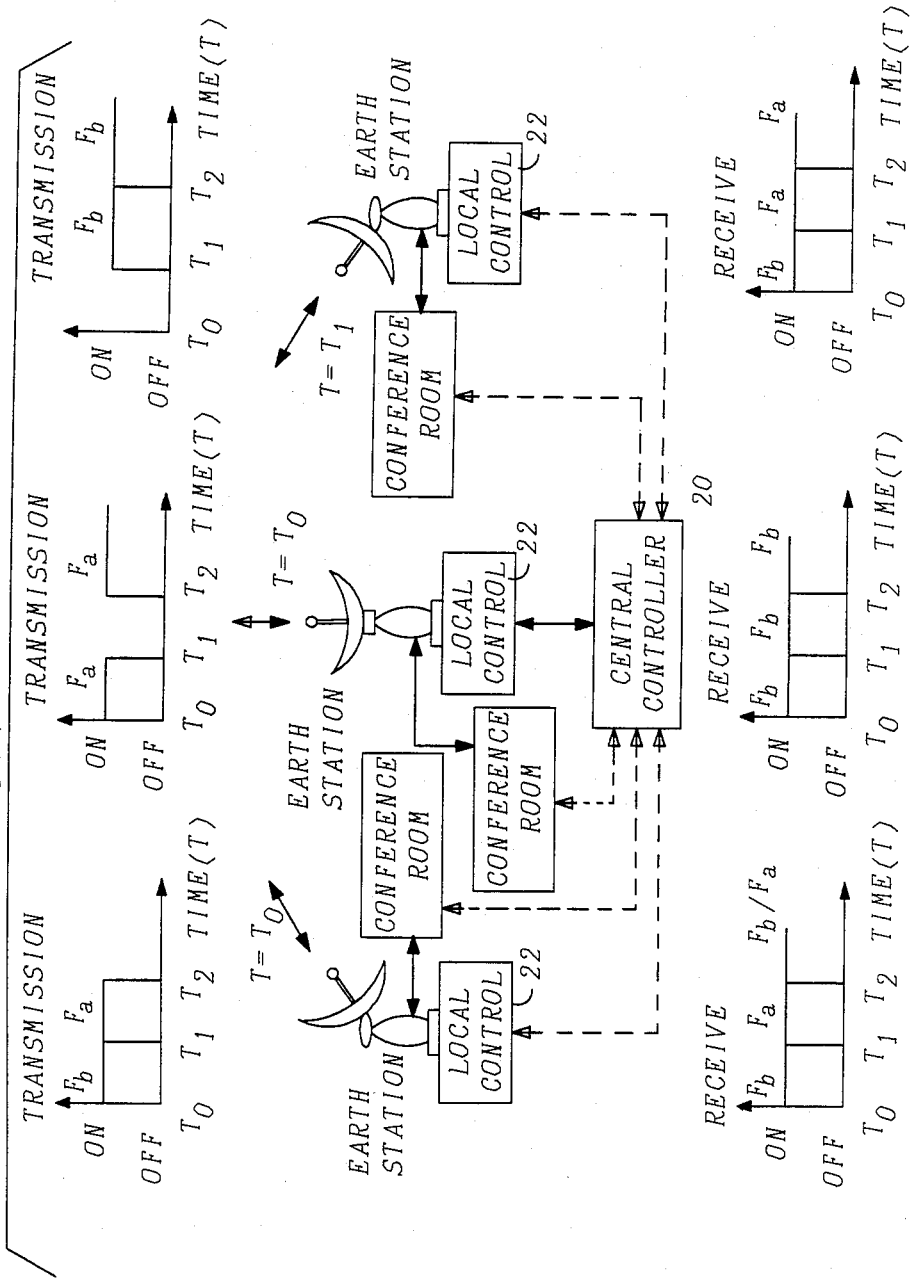
FIG. 1 illustrates the system control architecture of the invention.

In the multi-location video teleconferencing system, a call is supported by three separate sub-systems; a video sub-system, an audio sub-system and a control sub-system. The video, audio and control signals travel along separate network paths. FIG. 1 illustrates the control system architecture. The central controller 20, more descriptively referred to as the Video Teleconferencing Switching Controller, interacts with local control devices 22 at the earth stations, hereafter referred to as the Monitor And Remote Controllers.

Each conference room is connected to the video teleconferencing switching controller—via the session control panel and the video conference controller. The control channel is designed to effect switching and commands among the rooms.

Two satellite channels, Fb (broadcast channel) and Fa (auxiliary channel) provide the video transmission path under the control of the video teleconferencing switching controller.

Audio service can be provided either by multiplexing the video signal with the audio signal through the picture processor, or by using a terrestrial bridging service such as the AT&T ALLIANCE® teleconferencing service. When using the terrestrial conferencing service, an audio delay unit should be used to simulate satellite delay and the picture processor delay and allow for lip-synchronization.

Repeating, multi-location video teleconferencing provides participants with a face-to-face color video and audio conference. Satellite channels Fb and Fa (broadcast and auxiliary channel, respectively) are switchable uplinks which are assigned by the Director during a conference.

In the basic arrangement, there is one television monitor in each conference room to display the incoming picture of either the broadcaster room or the room which is using the auxiliary channel. Additionally, two television monitors can be provided, one to view the incoming video and the other to view the "own room" video. Another alternative is a split screen. The time periods T0, T1 and T2 illustrated in FIG. 1 are referred to below. In FIG. 1, video signals are represented by solid lines and control signals are represented by dash lines. C.R. represents a conference room; and E.S. represents an earth station.

Figure 2:
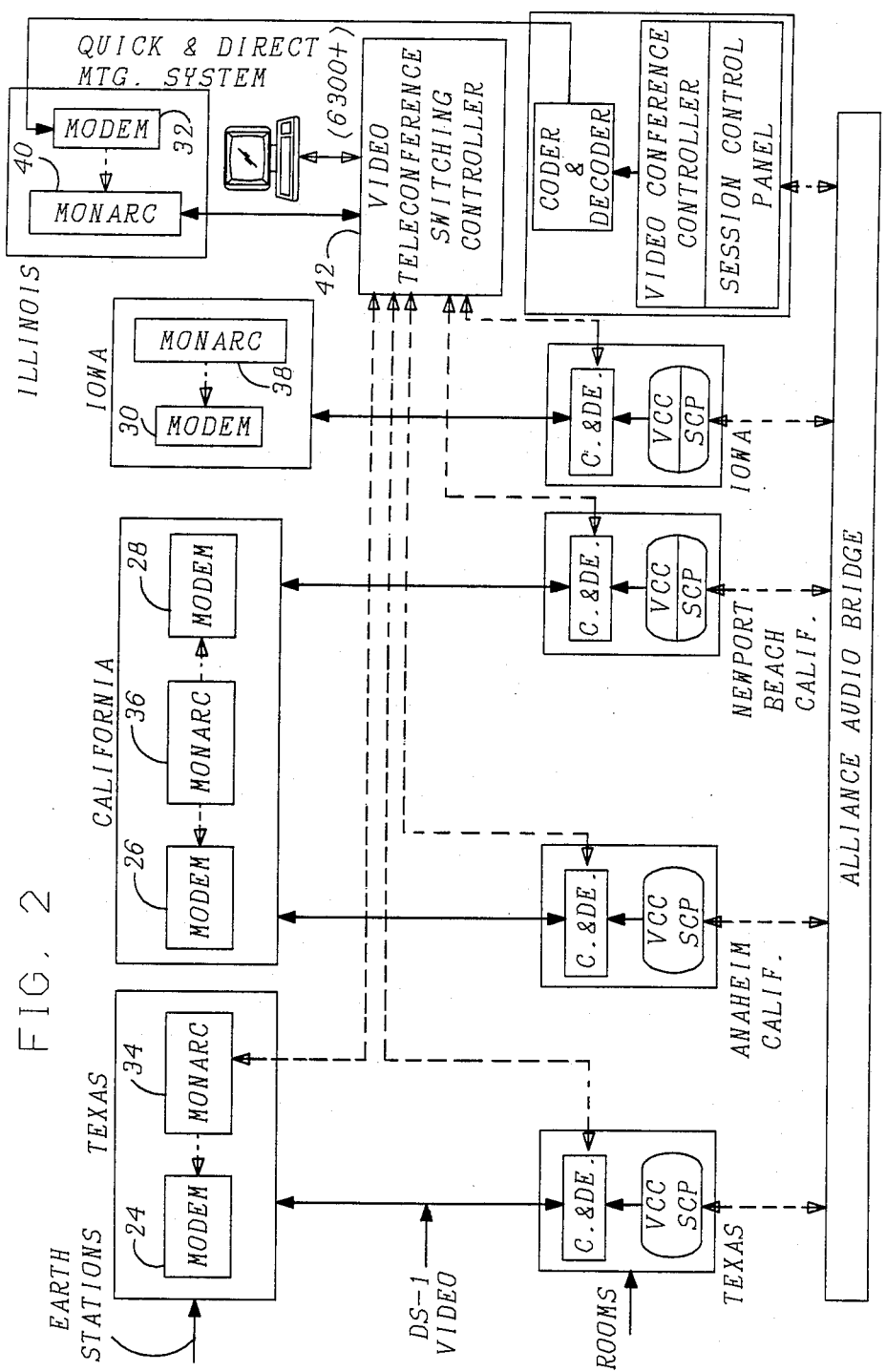
FIG. 2 illustrates the control network, the video transmission and audio arrangement of a multi-location video teleconference.

FIG. 2 illustrates, in block form, the control network, the video transmission details and the audio arrangement for a company having a multi-location video teleconferencing system having five conference rooms in different cities of the United States. Typically, the conference rooms are located at Texas; Anaheim, Calif.; Newport Beach, Calif.; Iowa and Illinois. Each conference room is connected to an earth station for communication to and from a satellite via ground lines which can be fiber optic cables. The modems 24, 26, 28, 30 32 at the earth stations operate with a 1.544 Mb/s alternate mark inversion bipolar data signal (hereafter, DS-1 video signal).

Dynamic switching of the DS-1 video signals during a call is accomplished by the control network. The Monitor And Remote Controllers (MONARC) 34, 36, 38, 40 tune and turn the modems on and off under the coordination of the video teleconferencing switching controller 42 serving the multi-location video teleconferencing call as the central controller. It communicates with the Monitor And Remote Controller (MONARC) at the earth stations and the Video Conference Controllers (VCCs) at the conference room. A video conference controller and its associated Session Control Panel (SCP) interface the participants in each conference room and the multipoint teleconferencing control network. The control signals of the video teleconferencing controller (VTC) can be divided into four major types as follows:

(1) The Video teleconferencing call set-up and take down commands;

(2) The Video teleconferencing dynamic switching commands;

(3) Call modifications commands (add and delete rooms from a conference and transfers the director's control); and, (4) Error and status messages.

The control network operates to generate, broadcast, and execute these commands.

The video sub-system resides primarily in the conference room and consists of video equipment such as a video camera, a coder/decoder and monitors.

The audio signals can be distributed in two ways. The first can be via satellite where the audio signal is distributed only with the video signals and is broadcast via the satellite to all conference rooms. A second method of distributing audio can be via a terrestrial bridge, such as ALLIANCE® teleconferencing service by AT&T.

In the first method where audio is distributed only with video signals, the outgoing image is multiplexed with the audio signal in the picture processor and broadcast via satellite.

If encryption is required for the system, the output signal of the picture processor can be routed to an encryption unit. In this instance, the only audio signal that can be broadcast in the network is the broadcaster's audio signal. The audio signal of the conference room using the auxiliary channel Fa, is received only by the broadcasting room.

The advantages of this method are that the video and audio signals are received at the same time and, therefore, an audio delay unit is not required at each conference room to obtain lip synchronization. The audio signal can be encrypted along with the video signals without requiring any additional equipment. A separate network is not required for audio broadcasting.

A disadvantage of this method is that the audio signals from the broadcaster's room and the room using the auxiliary channel are the only audio signals that can be transmitted in the network. The other participants are not heard.

In the second method, referring to the transmission of audio via a terrestrial bridges such as ALLIANCE® teleconferencing service, the audio signals from all multi-location video teleconferencing conference rooms are bridged onto a terrestrial conference bridge via four-wire circuits to avoid an echo. Briefly, ALLIANCE® teleconferencing is a network-based service provided by AT&T that allows customers with a Touch-Tone phone to set up a conference for either voice or data. This network can be used to broadcast the audio signal from one conference room to all other conference rooms.

Use of a terrestrial bridge requires a controlled delay which must be added to the incoming speech path at each conference location. The delay is necessary because the video component of the teleconference is carried by satellite, which adds about 250 m sec. of delay per hop. The picture processor adds further delay that ranges up to a maximum of about 188 m sec., depending on the processor used. In contrast, the terrestrial delay normally encountered by the audio signal is much less than 200 m sec. (depending on the transmission media such as microwave radios, optical fibers, twisted pairs or the like) assuming the toll portion of the telephone network carrying the audio does not include a satellite channel. Without added terrestrial delay a speaker's voice would be heard 300 to 400 m sec. before the speaker's image is seen. The lack of synchronization between lip movement and voice is unacceptably annoying to the participants of the conference. Therefore, audio/video synchronization is achieved by inserting enough delay into the audio path to match the video delay within 14 to 20 m sec. The absence of lip-sinc begins to become noticeable when the delay between the audio and the video signals exceeds 40 m sec. The delay circuit normally has a resolution of one m sec. and a total delay of one second.

The advantage of using a terrestrial bridge is that any room participating in the conference can broadcast its audio signal; and, each room receives all the audio signals, except its own. This provides the audio interaction feature to the conference.

There are, however, some disadvantages to using a terrestrial bridge as follows:

(A) An audio delay unit is required at each room to compensate for the video delay due to the satellite transmission path and the picture processor; and (B) No encryption for audio signals can be offered in the ALLIANCE ® teleconferencing service bridge.

Figure 3:
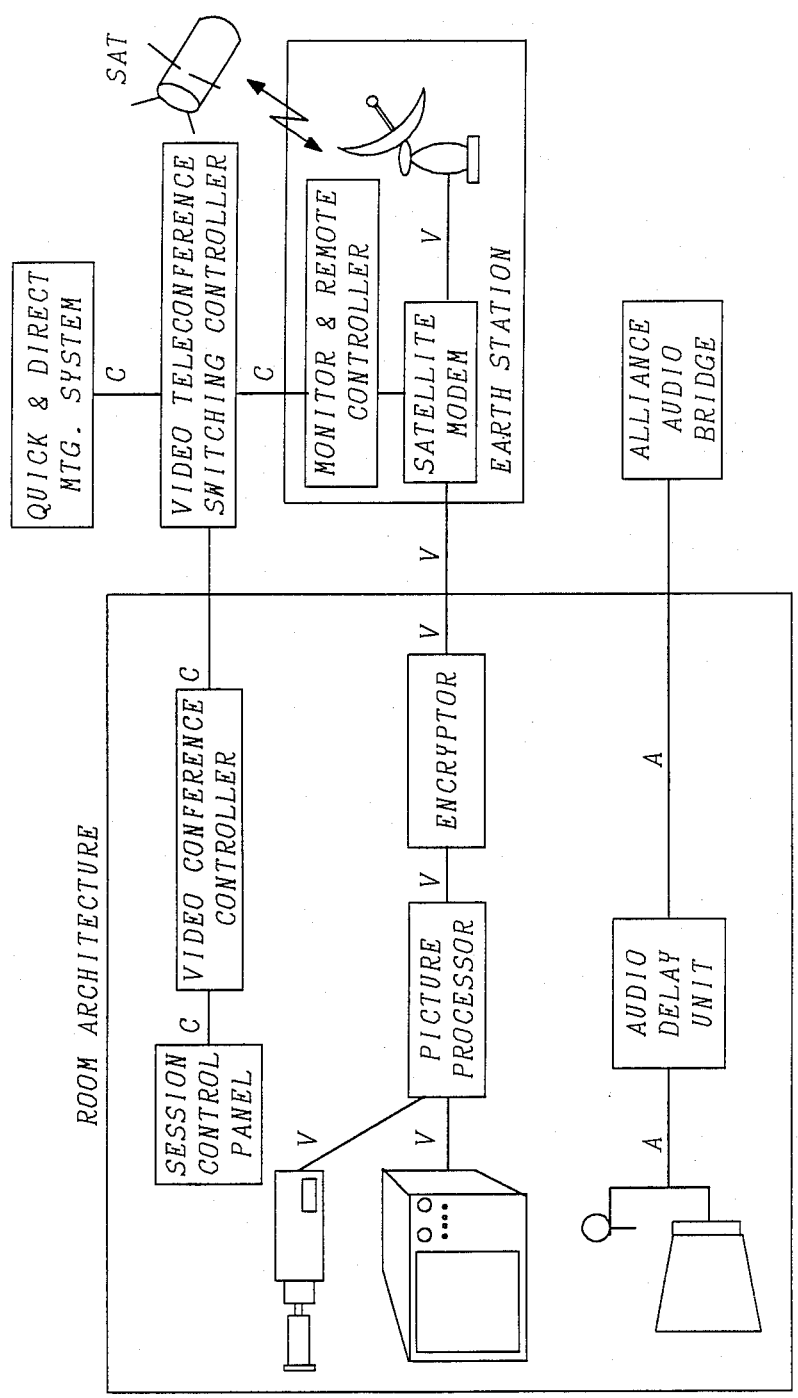
FIG. 3 illustrates a typical architecture example of the multi-location video teleconferencing.

A typical architecture example of the multi-location video teleconferencing is illustrated in FIG. 3. The three sub-systems for control, video, and audio are represented with the components of each sub-system. Assume FIG. 3 is at the director's room, where "C" designates control signals; "V" designates video signals; and "A" designates audio signals. In the control subsystem, the director touches the session control panel (SCP), a touch sensitive screen, to perform dynamic switching either for the broadcasting channel or the auxiliary channel. The control signal from the session control panel is transmitted to the video conference controller (VCC) in the same location. The video conference controller relays the director commands over a public switched network line to the video teleconferencing switching controller (VTSC). The monitor and remote controller (MONARC) at each earth station receives the commands from the video teleconferencing switching controllers and reconfigures the associated satellite modems as per the director's commands. In the video sub-system, the satellite modems control the transmit and the receive channels, from and to the video picture processor at the conference rooms, based on the commands received from the monitor and remote controller (MONARC) at each earth station. The audio sub-system illustrated is completely independent from the control and the video sub-systems. An audio delay unit is required in the incoming audio path to compensate for the video delay caused by the satellite hop and the delay due to the picture processor. A terrestrial audio network, for example AT&T ALLIANCE ® bridge, is required to bridge all the audio signals from the conference rooms.

Following is a description of the operation of the invention. Generally, there are two modes of operation, the reservation mode and the dynamic switching mode.

Referring to the reservation mode, two full-duplex frequencies can be used. The video teleconferencing switching controller directs the monitor and remote controller to tune the modems to the two frequencies according to the conference configuration. The video teleconferencing switching controller stores the identity of these two frequencies and sends the information to the monitor and remote controller as part of the set-up packets. Only the Quick and Direct Management System (which is comprised of software) and the Monitor And Remote Controller will know the absolute frequency in KHz. The person setting-up the conference reservation calls the reservations operator and specifies the following:

(A) The number of rooms in the conference and their locations;

(B) The location of the director's room; and (C) The location of the first room to occupy the auxiliary channel.

Figure 4:
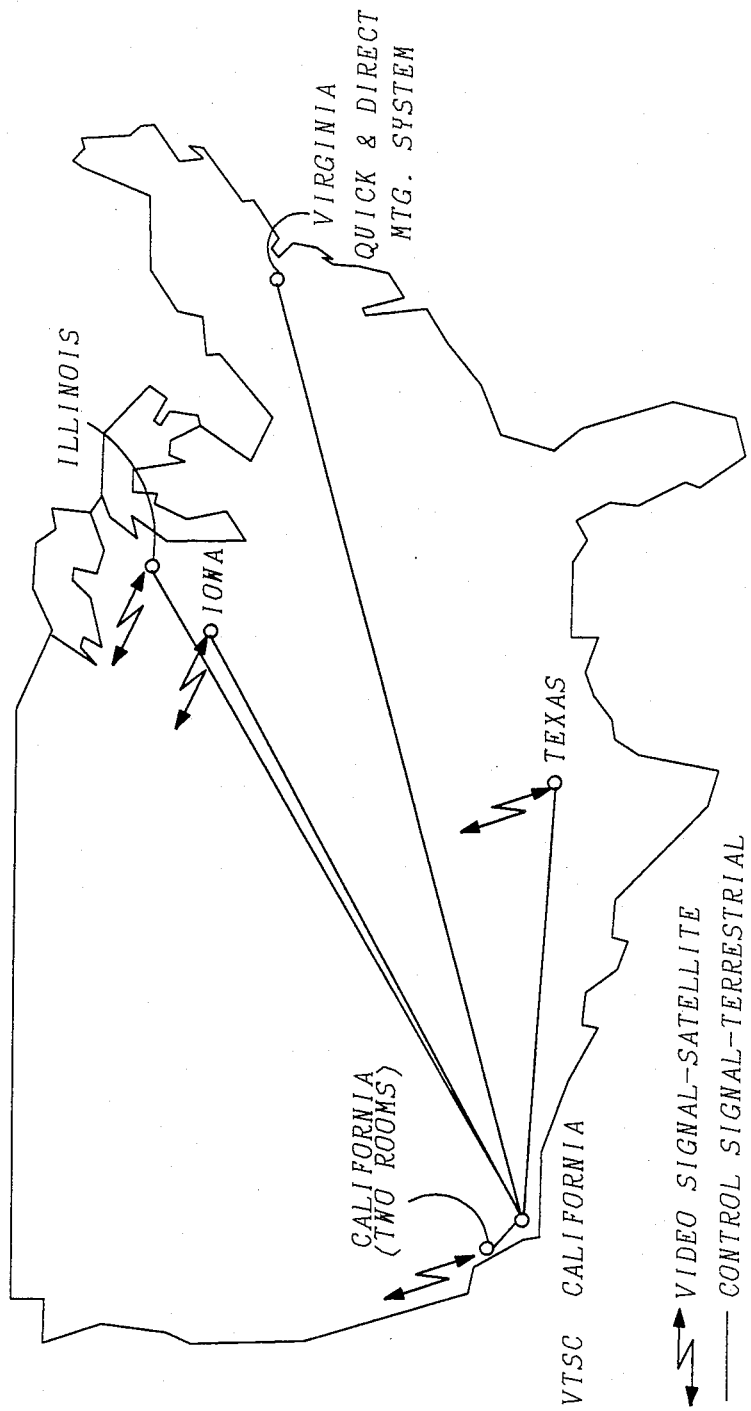
FIG. 4 illustrates a public switch network as a connecting link.

The reservation operator enters this information into the Quick and Direct Management System (QDMS) which can be located at a convenient location such as Dranesville, Va. (see FIG. 4). Reservation information is passed from the Quick and Direct Management System to the Video Teleconferencing Switching Controller (VTSC) which can be located at Anaheim, Ca. via a Public Switched Network line. The Video Teleconferencing Switching Controller then connects and sends separate commands to each Monitor and Remote Controller in the network.

The monitor and remote controller translates the commands and completes the initial set-up by controlling the modems as follows:

(A) The director's modem transmitter is tuned to the broadcast channel (Fb) and is turned on; the receiver is tuned to Fa.

(B) In the common conference room's modem, the transmitter is verified off and the receiver is tuned to Fb.

(C) The first room to use the Fa channel: The transmitter is tuned to Fa and turned on, and the received is tuned to Fb.

During the call, dynamic switching commands are generated and transmitted. They effect a room image change whenever the conference director selects a new transmitting room.

Figure 5:
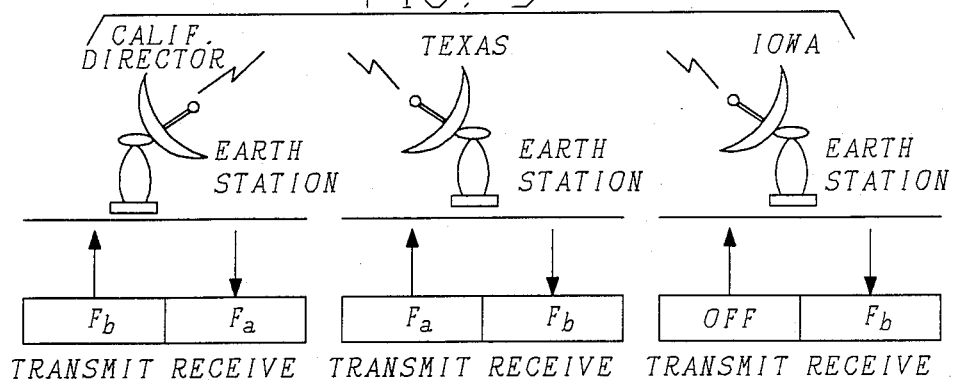
FIGS. 5, 6 and 7 illustrate switching sequences.
Figure 6:
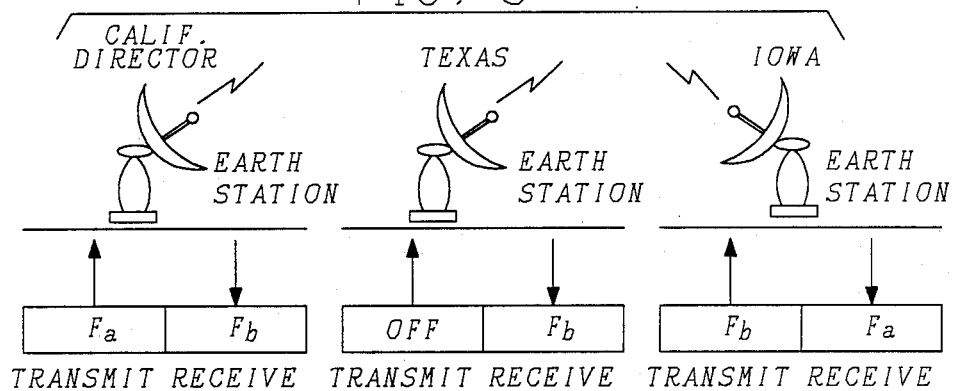
Figure 7:
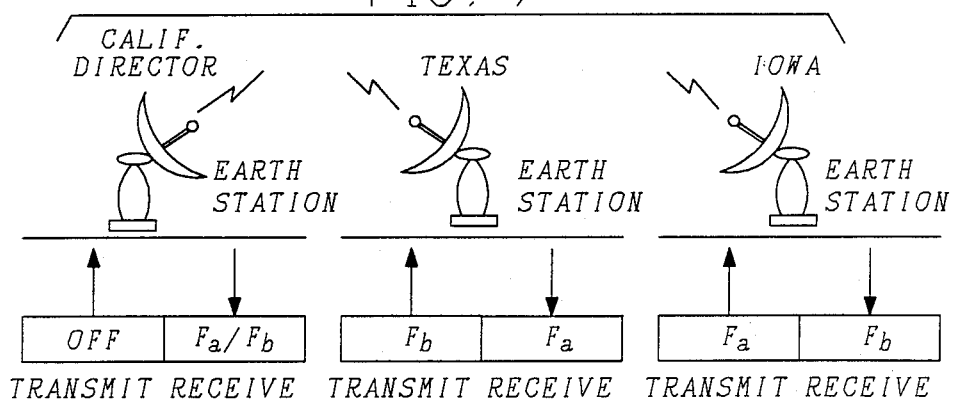

FIGS. 5, 6 and 7 relate to the switching sequences which involve the modems. Assume that the Multi-location Video Teleconference call involves three SKYNET ® satellite communications service earth stations, and three conference rooms. The director is at the California conference room, and the other two rooms are in Texas and Iowa.

Reference is made to FIGS. 1, 5, 6 and 7.

In the situation of FIG. 5, viewing starts at time T0 (see FIG. 1). For this time period at the start of the conference, the director broadcasts to all rooms using the Fb channel and, therefor, the other two rooms see the director. The director sees the room in Texas, the first room occupying the auxiliary channel. The auxiliary channel (Fa) is assigned to the conference room in Texas and, therefore, the director sees the conference room in Texas. Referring to the boxes under each earth station (FIG. 5), the director transmits on channel Fb and receives channel Fa. The conference room in Texas transmits on channel Fa and receives channel Fb. The conference room in Iowa receives channel Fb, but its transmitter is off.

The viewing situation of FIG. 6 starts at time T1 (see FIG. 1). During this time period the room in Iowa requests permission to broadcast by touching a REQUEST-TO-BROADCAST touch sensitive area on the Session Control Panel. This command passes from the Session Control Panel to the Video Conferencing Controller and then to the Video Teleconferencing Switching Controller. The Video Teleconferencing Switching Controller broadcasts this command to all the rooms in the conference. The Session Control Panels assigns a queue number ("1" in this case), which appears in an area for Iowa. The "1" indicates that the room in Iowa made a request to broadcast. Only the director can select the Iowa room to broadcast by touching the area for Iowa first and the BROADCAST CHANNEL area second on his or her Session Control Panel.

The Video Teleconferencing Switching Controller executes the director's commands in two different directions as follows:

(1) The Video Teleconferencing Switching Controller communicates with each Monitor and Remote Controller in the network to perform the dynamic switching. Each Monitor and Remote Controller executes the received commands to control its modem in order to complete the dynamic switching (see boxes under earth station of FIG. 6) as follows:
  (A) At the room in California (director's room)—turns the transmitter off tunes/it to Fa and turns it on again. The receiver is tuned to Fb.
  (B) At the room in Texas—turns the transmitter off and the receiver remains tuned to Fb channel; and
  (C) At the room in Iowa—tunes the transmitter to the Fb channel and turns it on. The receiver is tuned to Fa. Thus, the director transmits (Fa) to the room in Iowa; the broadcast channel Fb is assigned to the room in Iowa; and the room in Iowa broadcasts to all the rooms.

(2) The Video Teleconferencing Switching Controller communicates with each Video Conferencing Controller in the network to update the Session Control Panel screen in each room. The area for "Iowa" in each Session Control Panel is shaded and labeled "BROADCAST", indicating that the room in Iowa is the broadcaster. The area for "California" in each Session Control Panel is shaded, indicating that the room in California is using the auxiliary channel.

Referring to FIG. 7, viewing starts at time T2 (of FIG. 1). During this time period, the room in Texas requests to broadcast. The director has a choice of:

(1) Switching the uplink broadcast channel, Fb, from the room in Iowa to the room in Texas, or (2) Assigning his or her auxiliary channel Fa to the room in Texas to allow both rooms in Texas and Iowa to have face-to-face interaction.

Assume that the director selects the second alternative and touches in sequence, the display area marked Texas, and then the a display area marked AUXILIARY CHANNEL. As in the previous time period, the Video Teleconferencing Switching Controller receives the director's commands and implements the dynamic switching as well as updates the Session Control Panel as follows:

(1) For the room in California (the director's room)—the transmitter is turned off. The director has the "viewer's choice feature" during this mode of operation since he does not occupy either Fb nor Fa. The director is capable of tuning the receiver either to Fb to see the room in Iowa or to Fa to see the room in Texas.

(2) At the room in Texas—the transmitter is tuned to Fa and the receiver remains tuned to Fb.

(3) At the room in Iowa—no change from the previous time period.

Thus, the director has assigned auxiliary channel Fa to the room in Texas; the room in Texas transmits to the room in Iowa; Iowa broadcasts to all rooms; and the director has the option of receiving from either Texas or Iowa.

The Video Teleconferencing Switching Controller is linked to the Video Conferencing Controller at each conference room, to the Monitor and Remote Controller's at the earth stations, and to the Quick and Direct Management System at the reservation center.

The Video Teleconferencing Switching Controller is capable of interfacing with the Video Conferencing Controllers during the conference set-up and while the conference is in progress. Call set-up and dynamic switching information are exchanged between the Video Teleconferencing Switching Controller and the Video Conferencing Controller. The function of this link is to transmit four types of messages between the Video Teleconferencing Switching Controller and the Video Conferencing Controller as follows:

(1) The data link between the Video Teleconferencing Switching Controller and the Video Conferencing Controller can use a public switched network line at 1200 baud. The Video Teleconferencing Switching Controller establishes this link during the conference set-up phase. The Video Conferencing Controller responds to a call from the Video Teleconferencing Switching Controller during the call set-up phase and, also when the Video Teleconferencing Switching Controller attempts to reestablish the link if an interruption of the link has occurred.

(2) Requests from a non-director or common rooms. See FIG. 9 (lower left corner) which illustrates requests which can appear on the Session Control Panel. "Request-To-Broadcast" messages from the Session Control Panel in the common rooms are sent to the corresponding Video Conferencing Controller at the conference room. These Request-To-Broadcast messages are transmitted from the Video Conferencing Controller to the Video Teleconferencing Switching Controller. The Video Teleconferencing Switching Controller broadcasts these messages to all the Video Conferencing Controllers in the network. The Session Control Panels display a queue number assigned to the room requested to broadcast. A "CANCEL REQUEST" is treated in the same manner as a Request-to-Broadcast. The Session Control Panels eliminate the queue number as a response to this request.

Figure 8:
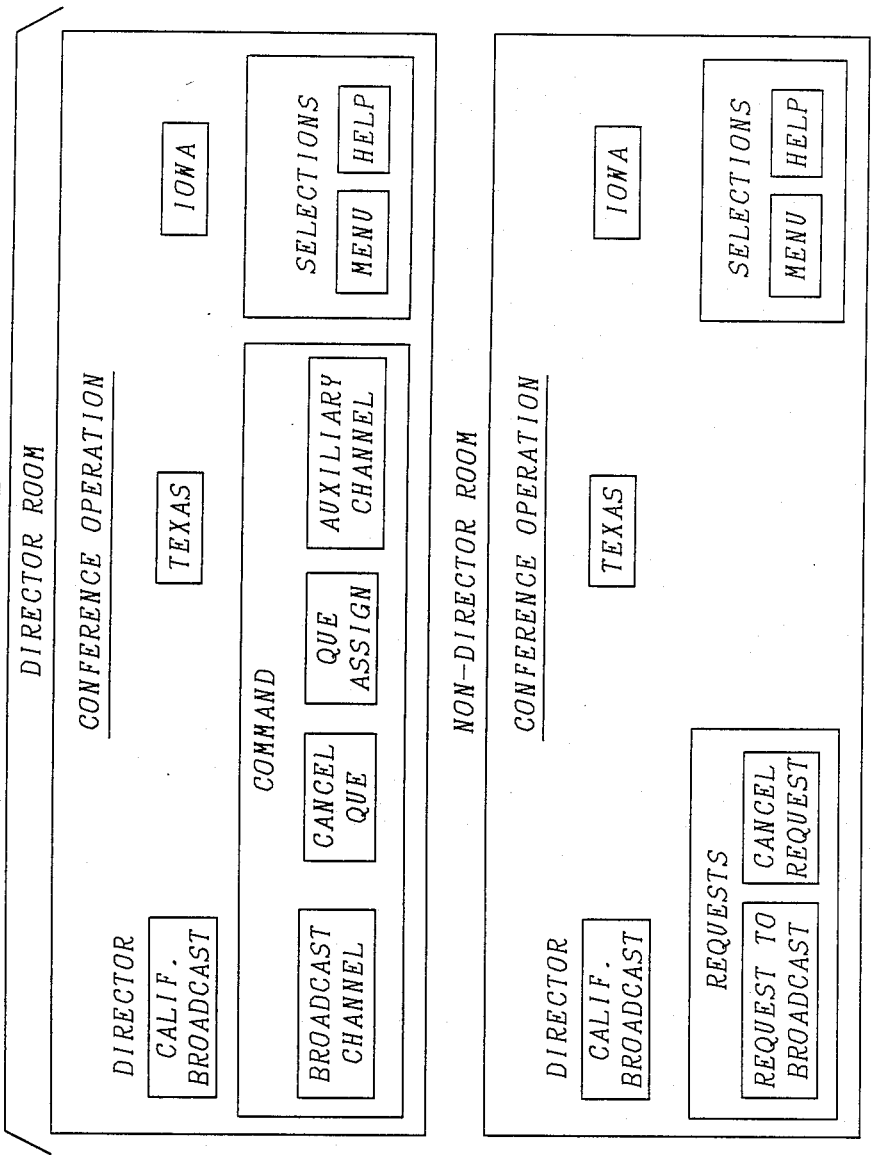
FIG. 8 illustrates information which can appear on the face of the Session Control Panel in the Director's room and the other conference rooms.

(3) Commands from the director's room—the various commands the director can issue from the Session Control Panel are illustrated in FIG. 8 (area marked "COMMAND"). These commands are Broadcast Channel, Cancel Queue, Queue Assign, and Auxiliary Channel. If the director touches any specific area on the Session Control Panel, the command is transmitted to the Video Teleconferencing Switching Controller. The response of the Video Teleconferencing Switching Controller to this command is discussed below.

(4) Error and status messages—the Video Conferencing Controller reports to the Video Teleconferencing Switching Controller the status of the picture processor equipment. It also accepts customer initiated quality reports and forwards them to the Video Teleconferencing Switching controller. Reports can be issued describing the availability of the video, the audio, and the control networks. Additionally, if the public switched network line between the Video Teleconferencing Switching Controller and the Video Conferencing Controller is disconnected during a conference, the Video Teleconferencing Switching Controller will detect the failure, automatically dial the line to re-establish the link, and up-date the Session Control Panel display. Once the link is re-established the Video Teleconferencing Switching Controller sends another message to the Quick and Direct Management System to indicate that the trouble has been cleared.

The Video Teleconferencing Switching Controller—Monitor And Remote Controller link is used for the following functions:

(1) The Video Teleconferencing Switching Controller dials the public switched network lines to establish the interconnections to the Monitor and Remote Controllers in the network before the conference starts;

(2) The Video Teleconferencing Switching Controller communicates with each Monitor and Remote Controller in the network simultaneously before the conference starts in order to set the satellite modems; and (3) The Video Teleconferencing Switching Controller responds to the director's commands during the dynamic switching mode of operation and sends separate commands to each Monitor and Remote Controller to change the satellite modems to the director's commands.

The Monitor And Remote Controller turns the transmitter section of the modem on and off; tunes the transmitter to the desired frequency; and tunes the receiver to the desired frequency.

Prior to a video teleconference, certain call set-up functions are performed by the video teleconferencing switching controller as follows:

(1) Responds to a message from the quick and direct management system to provide interface links between the video teleconferencing switching controller and the video conferencing controllers at the conference rooms and between the video teleconferencing switching controller and the monitor and remote controllers at the earth stations.

(2) Activates the appropriate sub-set of control functions for the Video Conferencing Controllers in the conference rooms; and, (3) Accept scheduled room-additions.

The Quick and Direct Management System is a software system which consists of two separate programs. One, running in the background, maintains a data link with the Video Teleconferencing Switching Controller (VTSC). The other provides a human interface via self explanatory, menu driven screens (windows). Together they allow an operator to setup, control and monitor a multilocation video conference. The two programs communicate with each other via files.

The personal computer used with the Quick and Direct Management System (QDMS) is the AT&T 6300+ personal computer with a 1.2 Megabyte floppy disk drive, a 20 megabyte hard disk, a color monitor and 1024 K bytes of RAM. An external Hayes modem is used to establish the link with the Video Teleconferencing Switching Controller.

The three main windows in the QDMS screen are:
CONFERENCE STATUS (top half of screen)
SYSTEM STATUS (middle of screen)
COMMANDS (Bottom one third of screen)

All windows are separated by green lines which also contain the window title. The green line on the bottom of the monitor contains instructions on cursor movement and which key to strike to exit QDMS. The CONFERENCE STATUS and the COMMAND window show subwindows specific to the command being executed.

CONFERENCE STATUS WINDOW. When a conference is active this window displays the rooms participating in the conference and their statuses. The window is refreshed every 4 seconds.

ROOM NAMES. The room names are listed in the left most column with the director on top and the first opposite (the room seen by the director at the beginning of the conference) below it. If a 'Transfer director' command is executed the new director is moved to the top of the room list.

Next to the room names are the room identifiers in parenthesis. These identifiers correspond to the Video Conferencing Controller (VCC) identifiers in the data base of the Video Teleconferencing Switching Controller (VTSC).

ROOM STATUSES. The room status can be one of the following:

| | |
|---|---|
| INACTIVE | The room is participating in the conference but the VTSC-VCC link has not yet been established. |
| TO BE ADDED | The room is not presently participating in the conference. |
| ACTIVE | The room is participating in the conference and the VTSC-VCC link is established. |
| DELETED | The room has been deleted from the conference, the VTSC-VCC link was taken down. |
| LINK DROPPED | The room is participating in the conference but the VTSC-VCC link was broken (because of a noisy phone line or possible hardware problems). The VTSC will automatically attempt to re-establish the link. |
| BEING DELETED | The delete room message was sent but the room has not yet acknowledged. |
| FROZEN | The room has acknowledged a director, his ability to switch has been removed from the Session Control Panel (SCP). |
| UNKNOWN | This indictes a corrupted data base. |

ROOM REPORTS. The right most column displays room problems. This provides a communication channel between the room (via the SCP-VCC-VTSC) and QDMS. All displayed problems are based on manual input to the SCP. The following displays are possible:

| | |
|---|---|
| No Picture, Network Problem | The television monitor shows a good picture when in local loop back but no picture when connected to the network. |
| Poor Picture, Network | The television monitor shows a good |

-continued

| | |
|---|---|
| Problem | picture when in local loop back but a poor picture when connected to the network. |
| No Picture, Room Problem | The television monitor displayed no picture in local loop back. |
| Poor Picture, Room Problem | The monitor displayed a poor picture in local loop back. |
| Control Problem | The SCP/VCC is not functioning properly. |
| No Audio | |
| Poor Audio | |

SYSTEM STATUS WINDOW

Top Line. When a conference is active this line shows the status of the last command transmitted to the VTSC. The following displays are possible:

| | |
|---|---|
| Command | This indicates that a command has been selected and executed and the appropriate message has been transmitted from the QDMS to the VTSC, but the VTSC has not yet sent a message. |
| Last command | This indicates that the command from the QDMS was accepted by the VTSC and the VTSC should begin executing it. |
| VTSC is BUSY | This indicates that the VTSC is not ready to accept the command from the QDMS. |

If no conference is active this line is blank.

Second Line

Modem States. The left side of this line shows the modem status while QDMS is in the process of establishing the link to the VTSC. The following displays are possible:

| | |
|---|---|
| Starting Modem Dialog | This indicates that QDMS has detected that the link to the VTSC is down and it has started to put the modem into "command" mode. |
| Modem OK | The modem has responded properly, QDMS will commence the dialing sequence next. |
| No phone number | The file does not exist. |
| Dialing | The phone number was transmitted to the modem, the modem is off-hook and dialing. |
| Connected | The remote modem has responded, the "carrier detect" light on the modem is on. |
| Modem not Responding | The modem is not responding properly, this generally indicates that the modem is not configured right. |
| No Carrier | This indicates a failed connection, the following are some of the more common reasons for failed connections: The called number is busy. does not answer (usually because the modem is not turned on or because it is configured wrong). There is no phone line connected to the local modem. There is no local dial tone. The line is extremely noisy and the modems can't acquire carrier. |
| Modem Error | This generally indicates that more than one task (program) is trying to access the modem. |

MONARC Link Count. When the link between QDMS and the VTSC is established the left side of the second line shows the number of the operational VTSC—MONARC links.

QDMS maintains a data base of the status of all MONARC links. The following is a listing of the possible link statuses and the messages from the VTSC necessary to assume those statuses:

| | |
|---|---|
| Connected | MONARC link established |
| Disconnected | MONARC disconnected |
| Failed | MONARC link failure MONARC connect failure |

Time and Date. The right side of this line shows the time and date.

Bottom Line. This line shows the status of the link between the VTSC and QDMS. If the VTSC returns the expected responses at the link level the message Link to VTSC is ok is displayed. If the VTSC does not respond, or if the responses are not recognizable the following message is displayed: LINK TO VTSC IS DOWN.

Command Window. This window displays all the commands that QDMS can execute. All commands, except Build Conference and Clear Room Report cause messages to be transmitted to the VTSC.

Command summary: This window allows a conference to be configured from a room menu.

When this command is selected the following changes take place:
- The 'CONFERENCE STATUS' window changes to the 'CONFERENCE CONFIGURATION' window.
- The 'COMMAND' window changes to the 'BUILD CONFERENCE' window.
- The system status window remains unchanged and active.
- The 'BUILD CONFERENCE' window now lists the names of all the rooms that can participate in a conference. A room can be selected to have one of four statuses in the conference to be configured:
  1. Director
  2. First Opposite
  3. Initially Active
  4. To be Added.

One of these options is displayed next to the window title.

When the 'BUILD CONFERENCE' window first becomes active, the select function is set to 'director'. The room name is also displayed in the 'CONFERENCE CONFIGURATION' window, with its status next to it. The selection function is automatically incremented to 'FIRST OPPOSITE'.

After the first opposite room has been selected the select function increments to 'INITIALLY ACTIVE COMMON ROOM'.

Possible error messages:

| | |
|---|---|
| AT LEAST THREE ROOMS ARE NEEDED | conference of less than three rooms has been configured. |

Changing Frequencies. After the new conference is stored, or aborted, the 'Change Frequencies' menu is automatically invoked. This menu allows the operator to select the broadcast and auxiliary frequencies used by the conference. At the start of the conference the director transmits on the broadcast frequency (Fb), the first opposite room on the auxiliary frequency (Fa). Generally, two frequencies will be assigned to a conference, either frequency can be assigned to Fb, the other to Fa.

A menu of frequencies is presented in the command window. After two frequencies have been selected the menu disappears and both frequencies are displayed.

Clear Room Report. This command allows a room alarm to be cleared. Room alarms are displayed in the right most column of the status window.

Setup Conference. After this command is selected the abort execute prompt appears in the command window and the conference configuration (obtained from the file CONF) is shown in the status window.

Add Room. This command allows a room to be added to an ongoing conference.

Delete Room. this command allows a rooms to be deleted from an ongoing conference. The room to be deleted cannot be the director.

Transfer director. This command allows transfer of the director to any active room in the conference. The present director becomes a common room. The new director's room is moved to the top of the status display.

Takedown Conference. This command causes the VCC links to be disconnected and the conference information removed from the VTSC data base. The IF carriers of all FDMA satellite modems looped back.

Freeze Conference. This command causes the VCCs involved in the conference to display a message which indicates that because of transmission problems the conference cannot be reconfigured (no dynamic switches can be performed).

Unfreeze Conference. This command restores a frozen conference to the active status.

Room Termination Warning. This command notifies the conferees, via the Session Control Panels that a room will be deleted from the conference shortly. The operator is prompted for the remaining time (in whole minutes) and the room identifier.

The director's SCP displays and counts down the warning times of all warned rooms. Common rooms only display and count down their own warning times.

Transfer director Warning. This command causes a message to be displayed on all the SCPs in the conference that warns the conferees that the director will be transferred to another location.

Conference Termination Warning. This command warns all conference participants that termination of the conference is imminent.

Figure 10:
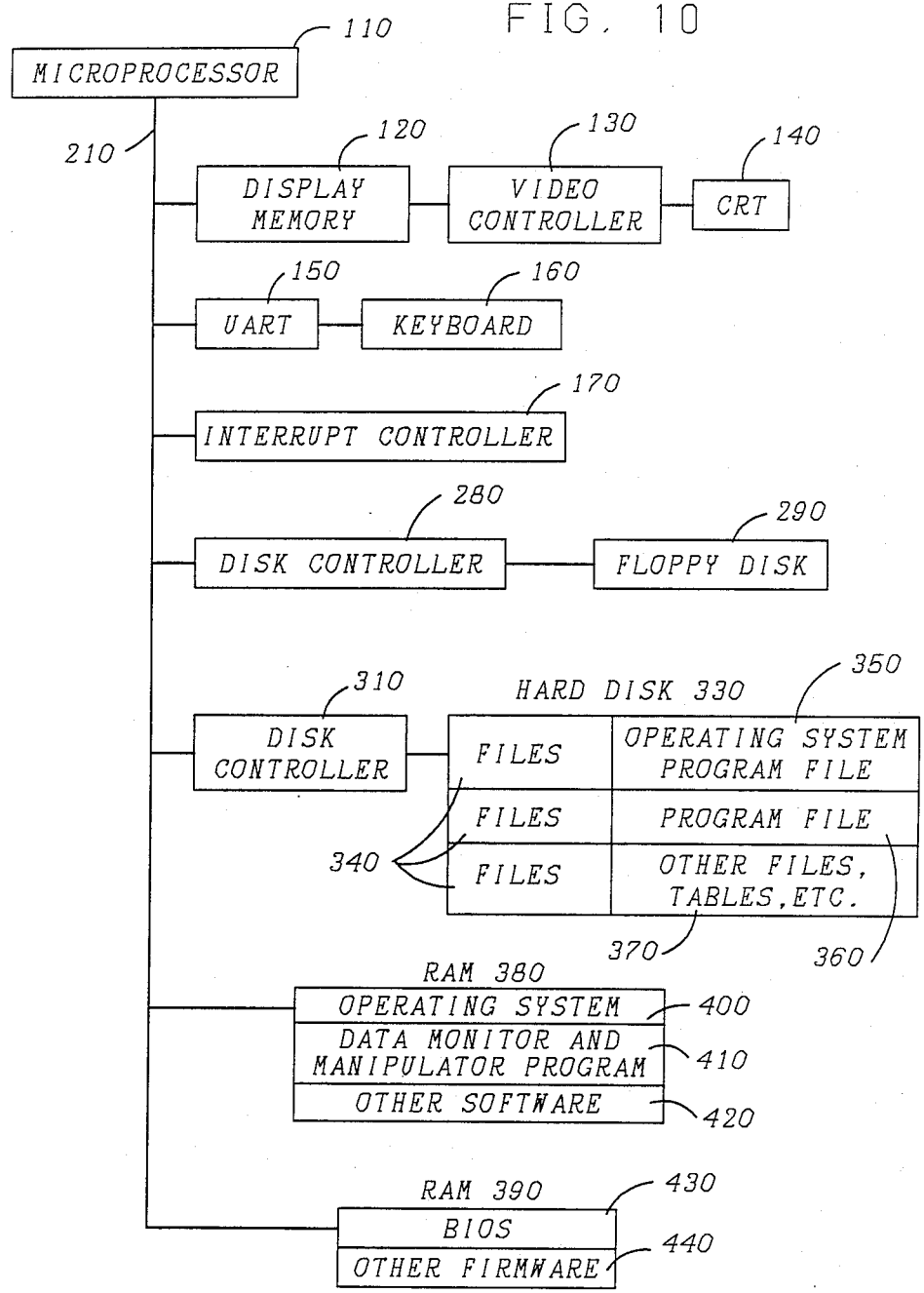
FIG. 10 is a block diagram of a microcomputer system.

The system uses a standard microcomputer. Illustratively (FIG. 10), a microcomputer which can be used is the AT&T Model PC6300 plus personal computer, at the heart of which is a microprocessor 110 having address, data and control buses denoted generically as bus 210. Connected to bus 210 are a display memory 120, whose contents are used by a video controller 130 to generate video signals for a CRT 140; a universal asynchronous receiver transmitter (UART) 150, which serves as a serial interface between microprocessor 110 and a keyboard 160; an interrupt controller 170, to which hardware interrupt leads (not shown) extend, inter alia, from UART 150; a floppy disk controller 280, which serves as an interface between microprocessor 11 and a floppy disk memory 290 and a hard disk controller 310, which serves as an interface between microprocessor 110 and hard disk memory 330. The latter hold, inter alia, text files 340; a copy of the workstation's operating system 350 illustratively the UNIX ® operating system; a copy of an application module 360, herein referred to as "program file" which, when executing, performs the various functions and controls the system hardware in accordance with the principles of the invention, and a number of other files not here relevant indicated at 370.

Also connected to bus 210 in random access memory (RAM) 380 and read only memory (ROM) 390. When the system is in operation, RAM 380 holds the executed copies of (a) the operating system, indicated as 400, and (b) data monitor and manipulator program, indicated at 410, and (c) other software not here relevant, indicated as 420. ROM 390 contains the conventional Basic Input-/Output System (BIOS) 430 as well as other firmware 440.

The present invention utilized hardware and/or software in combination with a personal computer and its peripheral devices (i.e, storage media, peripheral control, video display and the like).

The mode of operation of the invention is accomplished with software which appropriately programs the personal computer.

Figure 11:
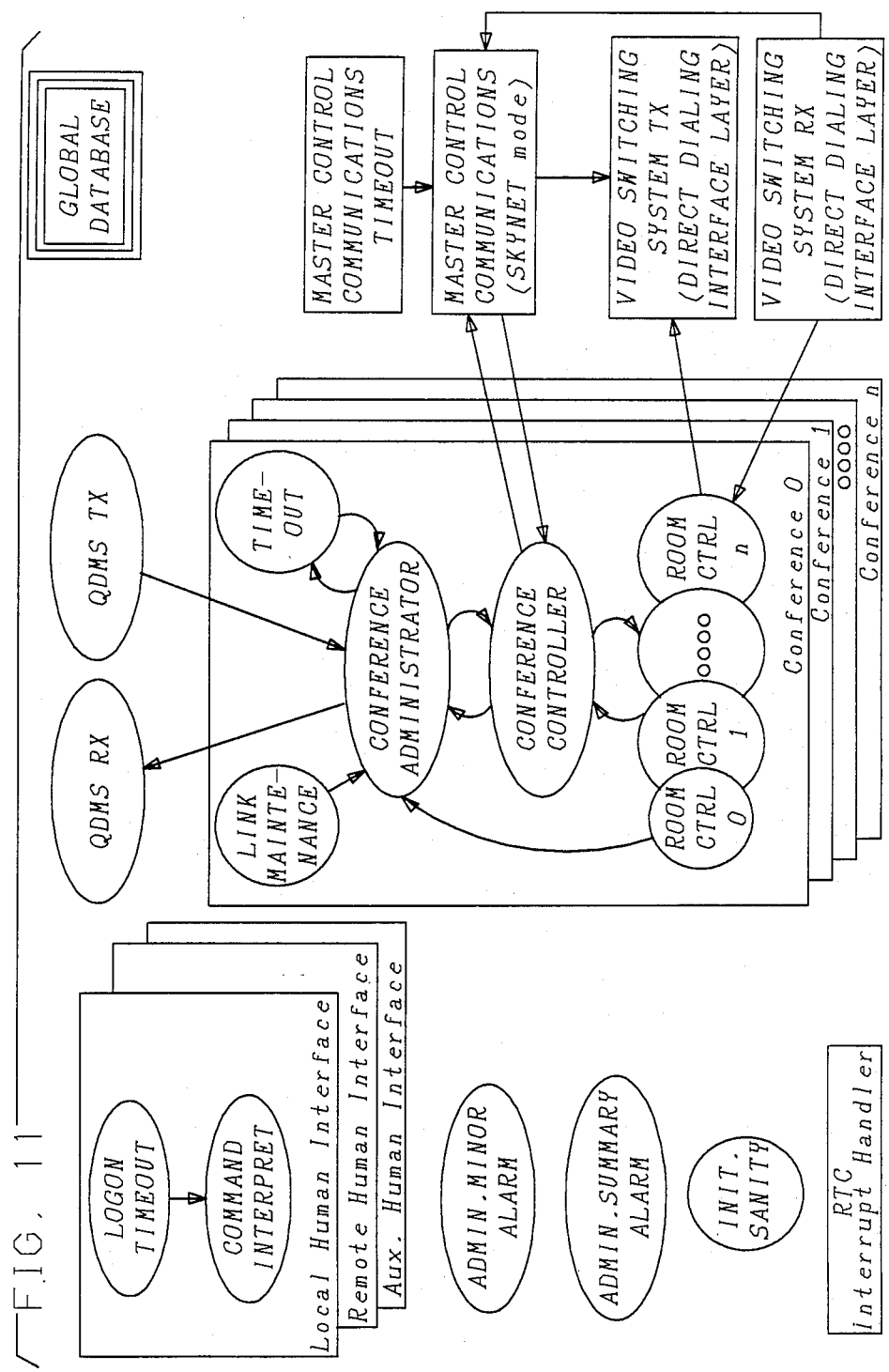
FIGS. 11–15 are flow charts of the processing performed by software within the system.
Figure 12:
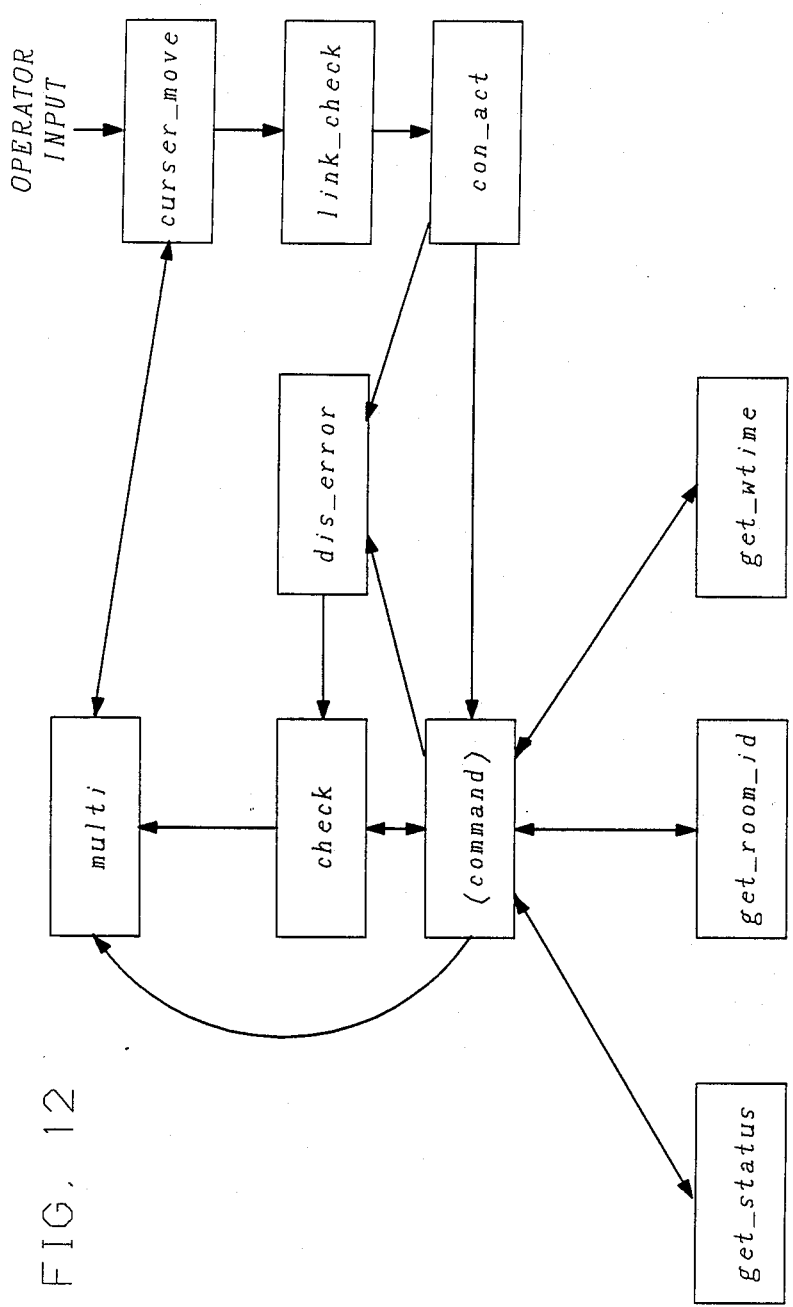

The flowcharts 13–16 are illustrative of the process performed to effect video teleconferencing in accordance with the principles of the invention as explained above. FIG. 11 is a flow chart of system date flow. FIG. 12 is a flow chart of the command information flow. The area "COMMAND" can be any of the following: set-up, add, delete, takedown, transcoord, clear—ala, freeze, unfreeze, build or the like. The area labeled "get-status" will be executed for the following: add, delete, and the like. The area labeled "get-room-id" will execute for add and delete.

Figure 13:
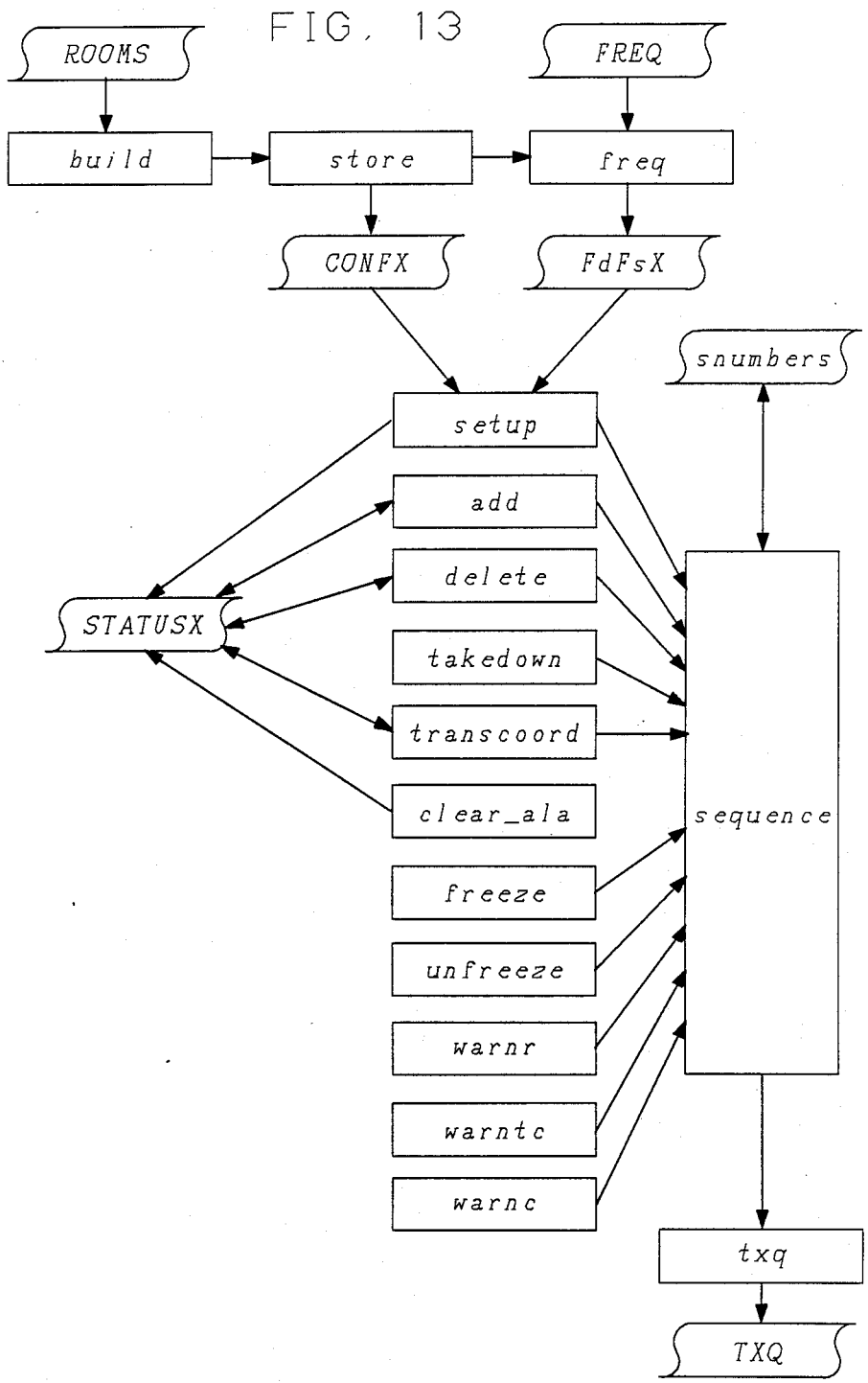

FIG. 13 is an information flow chart of the command execution of the Quick and Direct Management System.

Figure 14:
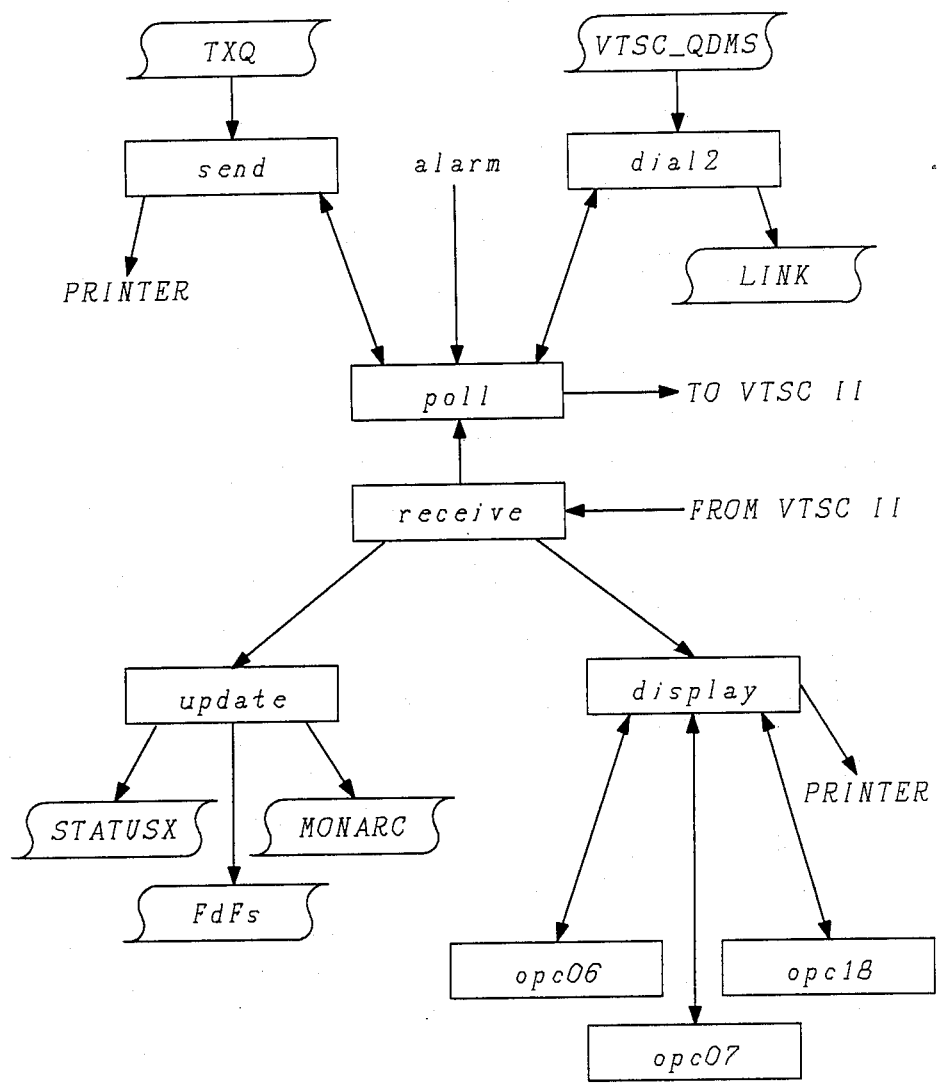

FIG. 14 is the Video Teleconferencing Switching Controller interface information flow of the Quick and Direct Management System.

Figure 15:
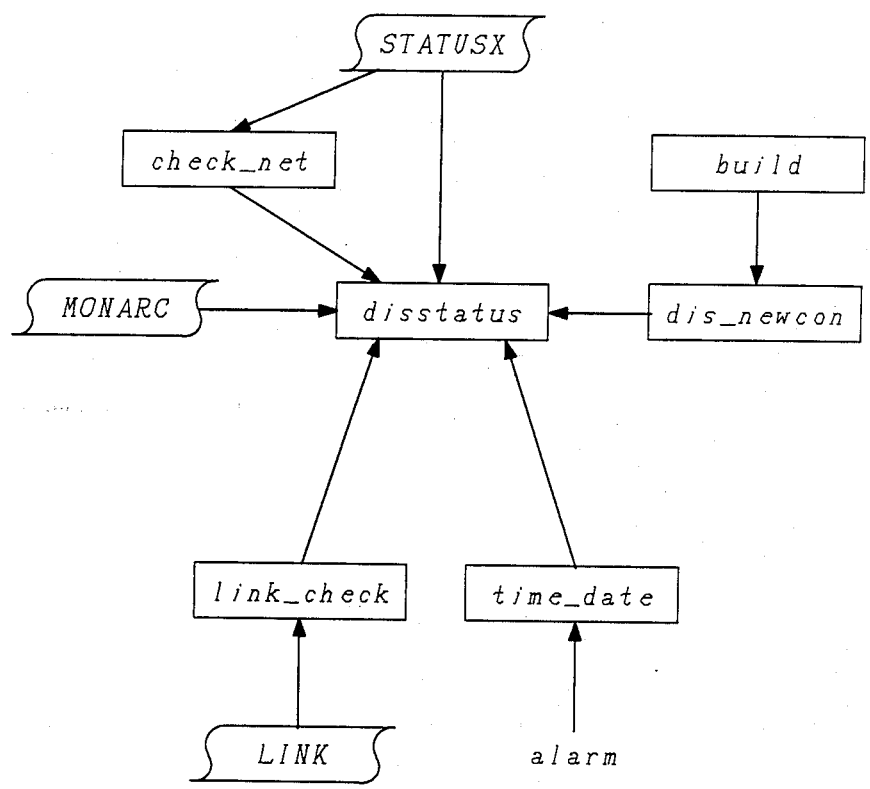

FIG. 15 is the screen display information flow of the Quick and Direction Management System.

The preceding merely illustrates the principles of the invention. For example, although the invention has been disclosed in the context of a particular hardware configuration, other hardware configurations providing the same functionality may be used. Although the presently disclosed system maintains the information acquired in local storage, it may be decided—particularly if there is a large volume of requestable information to store that information on a larger system and have the local system, i.e., the system interacting with a specific video teleconference, request and have downloaded the information when it is needed.

It will thus be appreciated that those skilled in the art will be able to devise numerous arrangements which, although not explicitly shown or described herein, embody the principles of the invention and are within its spirit and scope.

I claim:

1. A method for establishing video-audio communications between more than two remotely located conference rooms characterized by designating one of the conference rooms to be the director's conference room, assigning a broadcast satellite channel to broadcast from any one of the conference rooms to all other conference rooms, assigning an auxiliary satellite channel to transmit from any one of the other conference rooms to the room assigned to the broadcast satellite channel, using frequency division multiple access satellite transmission of the broadcast channel and the auxiliary channel, and using public switch network lines to transmit control signals from the director's conference room to satellite modulators-demodulators (modems) located at earth stations via a video teleconferencing switching controller and a monitor and remote controller at each earth station coupled to selectively tune the modulators to said broadcast channel or said auxiliary channel, and to selectively tune the demodulators to one of the two channels, and to selectively turn the modulators on or off.

2. The method of claim 1 further characterized by transmitting audio signals among the conference rooms via a terrestrial audio network.

3. The method of claim 2 further characterized by delaying the audio signals to compensate for video delay due to satellite hop.

4. The method of claim 3 further characterized by encrypting the signals transmitted via the satellite channels.

5. The method of claim 1 further characterized by connecting all conference rooms to view the person speaking; and connecting the conference room of the speaker to view the room using the auxiliary channel.

6. The method of claim 1 further characterized by multiplexing the audio and the video signal in the picture processor in the broadcaster's room and the room using the auxiliary channel.

7. The method of claim 1 further characterized by from the director's room, selecting the broadcast satellite channel or the auxiliary satellite channel for receipt by the director's room.

8. The method of claim 7 further characterized by transferring, during a conference, the room being designated as the director's conference room to any other room of the conference.

* * * * *